Nov. 10, 1964 R. H. CARLSON Re. 25,676

COLD HEADER DRIVES

Original Filed April 18, 1960 2 Sheets-Sheet 1

INVENTOR

RAYMOND H. CARLSON

BY Buckhorn, Cheatham & Blore

ATTORNEYS

Nov. 10, 1964 R. H. CARLSON Re. 25,676

COLD HEADER DRIVES

Original Filed April 18, 1960 2 Sheets-Sheet 2

INVENTOR

RAYMOND H. CARLSON

BY Buckhorn, Cheatham & Blore

ATTORNEYS

United States Patent Office

Re. 25,676
Reissued Nov. 10, 1964

25,676

COLD HEADER DRIVES

Raymond H. Carlson, Rockford, Ill., assignor to Textron Industries, Inc., Rockford, Ill., a corporation of Delaware Original No. 3,107,557, dated Oct. 22, 1963, Ser. No. 22,963, Apr. 18, 1960. Application for reissue May 4, 1964, Ser. No. 375,686
1 Claim. (Cl. 78—17)

Matter enclosed in heavy brackets [ ] appears in the original patent but forms no part of this reissue specification; matter printed in italics indicates the additions made by reissue.

This invention relates to metal-working machines such as cold headers or the like and particularly to a driving mechanism for the slide or gate of a cold heading machine. It will be understood, however, that it is applicable to parts-forming machines employing a slide or gate other than cold headers.

It is the usual practice in machines of this character to employ a machine having a frame upon which is mounted in fixed position a die bed or block carrying the working dies and a slide or gate slidably mounted on the frame carrying one or more punches to cooperate with the dies. Means are provided for feeding a length of wire or rod stock through the die bed, at the die end of the frame, from which length a workpiece is severed and carried to the first die (if more than one are provided). The gate or slide is usually mounted at the other end of the frame, and at this latter end means are provided for reciprocating the gate. This means usually exerts a "pushing" force upon the gate and for this reason that part of the frame upon which the gate is carried must withstand the reaction of the effort exerted by the punch against the work in the die. The frame must, therefore, be of massive construction to withstand such a force.

In the present instance the gate or slide is operated by driving mechanism mounted in the die end of the frame, and the connecting means between this mechanism and the gate is such as to exert a "pull" upon the gate and draw it toward the dies so that any force tending to spread the two ends of the frame is eliminated. Thus the driving mechanism for the gate is at the same end of the machine into which the length of wire or rod stock is fed.

One object of the present invention is to provide a new and improved means for actuating the gate of a header or like mechanism.

Another object of the invention is to provide a header comprising one or more working dies and a reciprocably mounted gate carrying a tool or tools cooperating therewith, with improved means for reciprocating the gate including links connected to the gate and placed under tension during the working stroke of the latter.

Still another object of the invention is to provide a header having one or more working dies and a reciprocating gate carrying tools cooperating therewith, with actuating means for the gate, which actuating means is disposed upon the side of the dies remote from the gate, and links connecting the actuating means with the gate adapted to draw the gate toward the dies.

To these and other ends the invention consists in the novel features and combinations of parts to be hereinafter described and claimed.

Figure 1:
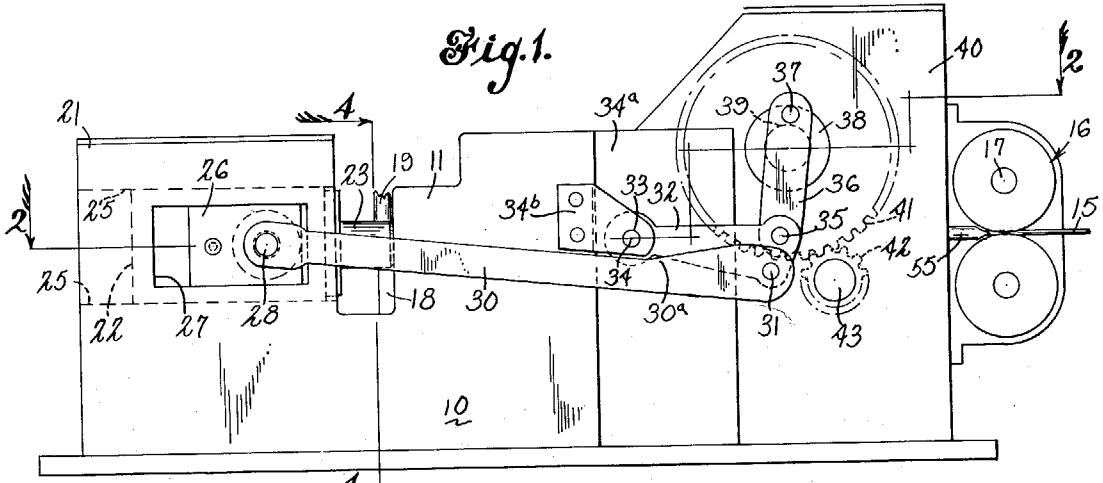
FIG. 1 is a side elevational view of a header or like mechanism embodying my invention.
Figure 2:
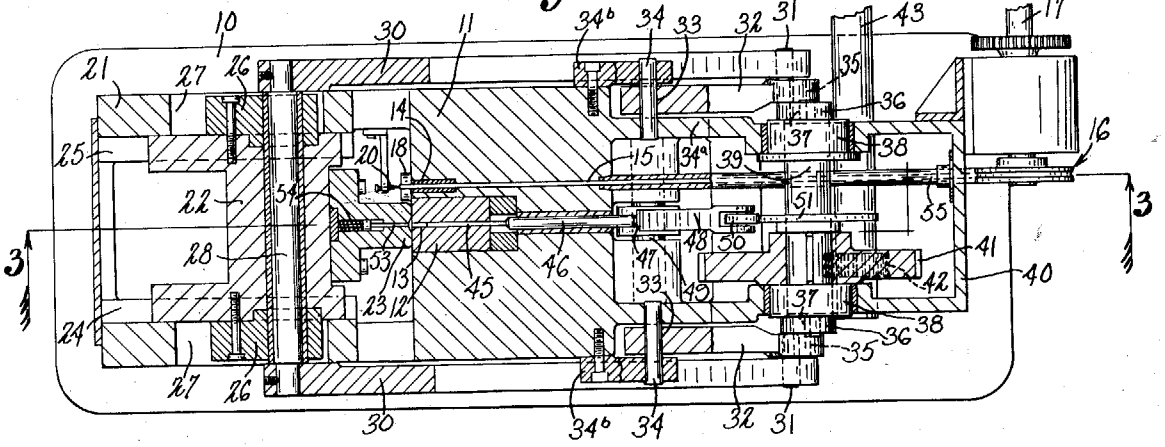
FIG. 2 is a horizontal sectional view on line 2—2 of FIG. 1.

To illustrate one embodiment of the invention I have shown in the drawings a cold heading machine comprising a frame designated generally by the numeral 10 upon which is mounted a die block 11 carrying a heading die 12 provided with an opening or cavity 13 to receive the work. The die block is also provided with a cut-off die 14 through which a length of wire or stock 15 is fed by feeding mechanism shown conventionally at 16. As illustrated, this feeding mechanism consists of a pair of cooperating grooved wheels between which the stock passes, which wheels may be driven in the usual step-by-step manner by conventional means from a shaft 17, the latter being driven from a suitable source of power.

Cooperating cutting elements 18 and 19 are mounted at the face of the die block 11 to sever a projecting end of the wire or rod stock for use as a workpiece and carry this workpiece to a position opposite the die opening 13. An adjustable work stop 20 may be provided against which the stock is fed to determine the length of the workpiece to be severed. The cutting elements may be operated by the mechanism shown in the application of Herbert L. Hoyt, Serial No. 7,703, filed February 9, 1960, but as this mechanism is not part of the present invention, no further description is given herein.

The frame is provided with an upstanding portion 21 at one end in which is slidably mounted the gate or slide 22 which carries a punch 23 designed to cooperate with the die 12. As illustrated, the slide is guided by ledges 24 and 25 formed on the frame, two of these ledges being above and two below the slide. Secured at opposite sides of the latter are bearing blocks 26 which operate in openings 27 in the side walls of the frame portion 21, and a shaft or rod 28 extends through the slide and through these blocks projecting from the latter at both ends.

The rod 28 is rotatably mounted in the slide 22 and blocks 26, and to the projecting ends of this rod are secured links or pitmans 30 which project toward the other or drive end of the machine. The other end of each of these pitmans is pivotally connected as at 31 to a lever 32 of roughly triangular shape, these levers being pivoted at 33 upon pins or rods 34 having their inner ends secured to the frame member 34$^{a}$. Blocks 34$^{b}$ secured to the frame support the outer ends of these rods. As the blocks 34$^{b}$ are in substantially the same vertical plane as the pitmans 30, the latter may be offset slightly as shown at 30$^{a}$ to clear the blocks and still maintain the lines joining the axes of the pivots 28 and 31 within the outlines of the pitmans.

Pivoted at 35 to each of these levers is one end of a link or connecting rod 36, the other end of which is pivotally connected to a crank pin 37 provided eccentrically on a crank disk 38. The disks 38 are fixed to, or formed integrally with, a crank shaft 39 rotatably mounted in the rear portion 40 of the frame.

A gear 41 is secured to the shaft 39, and the teeth of this gear mesh with those of a pinion 42 mounted upon a shaft 43 rotatably mounted in the frame portion 40. This shaft may be driven from any suitable source of power which constitutes the driving power of the machine. With this construction it will be apparent that when the shaft 43 is rotated, the pitmans 30 will be reciprocated, resulting in reciprocation of the gate, moving the punch 23 toward and from the die 12.

Figure 3:
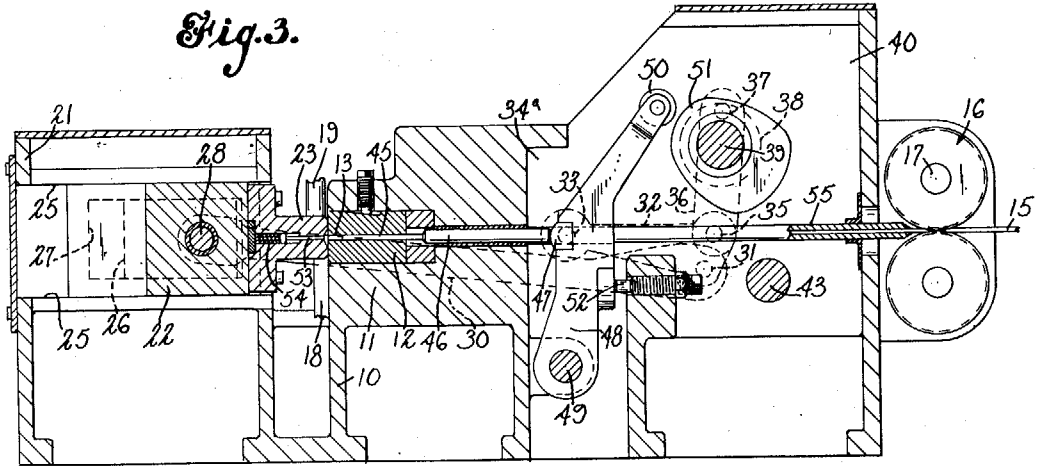
FIG. 3 is a vertical sectional view on line 3—3 of FIG. 2.

A knock-out pin 45 (FIG. 3) is slidably mounted in the die 12 and is driven by a knock-out rod 46, the rear end of which rests against the knee 47 of a lever 48 pivoted to the frame at 49. The free end of this lever carries a cam follower roller 50 designed to be engaged by a cam 51 mounted upon the shaft 39. The lever 48 may, in the closed position of the tools shown in FIG. 3, rest against a stop 52 adjustably secured to the frame so that the position of the knock-out pin, which also acts to close the rear end of the die opening, may be adjustably limited according to the depth desired for the die opening.

The punch 23 may be provided with a knock-out pin 53 spring pressed toward a protracted position by the spring 54, which pin will not only serve to eject the work from the punch, but also serve to engage the workpiece when the latter is carried to a position in front of the die opening by the cutter 18 as the punch approaches the die during the forward movement of the punch.

Figure 5:
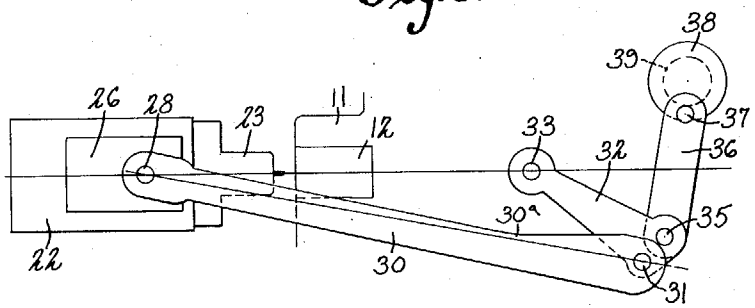
FIG. 5 is a diagrammatic view showing the operation of the drive for the header slide or gate.
Figure 4:
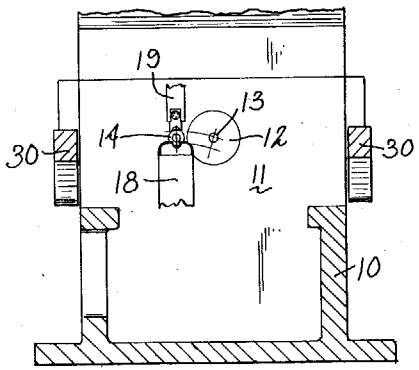
FIG. 4 is a sectional view on line 4—4 of FIG. 1.

In the operation of the machine the length of stock 15 will be fed through the quill 55 and cut-off die 14 against the work stop 20, and a workpiece will be cut therefrom by the cutting elements 18 and 19 and carried to a position opposite the die opening 13. At this time the parts will be in the position shown diagrammatically in FIG. 5 wherein the punch is in its open position or in a position withdrawn from the die. Upon rotation of the shaft 39 and cranks 38 from this position the levers 32 will be moved upwardly about their pivots 33 toward the position shown in FIG. 1. This will exert tension upon the pitmans 30 and [drawn] *draw* the slide 22 and punch 23 carried thereby toward the die to the final or closed position shown in FIG. 1.

Upon continued rotation of the shaft 39 in the direction of movement of the levers 32, pitmans 30 and slide 22 will be reversed, withdrawing the punch from the die. At this time the lever 48 will be engaged by the cam 51 so as to drive the pin 45 toward the left as shown in the drawings and eject the work from the die. The spring-pressed pin 53 will serve to prevent the work from sticking to the punch.

It will thus be seen that the working stroke of the punch is the result of tension applied to the pitmans 30 to exert a pull upon the slide 22 and draw it toward the die, rather than a pushing force upon the slide, the reaction to which must be taken by the gate or slide end of the frame as is usual in machines of this type. Also all of the driving mechanism including that for the feed of the stock and for the operation of the slide are mounted at the same end of the machine. Thus the frame may be of lighter construction than is the case where the driving means for the slide is provided at the end of the machine opposite the die bed in which event the force exerted upon the work tends to spread the two ends of the frame.

While I have shown and described one embodiment of my invention, it will be understood that it is not to be limited to all of the details shown, but is capable of modification and variation within the spirit of the invention and within the scope of the claim.

What I claim is:

A cold heading machine comprising:

a horizontally extending relatively light weight frame, a die block fixedly positioned intermediate the opposite ends of said frame and having a substantially vertically extending face, a horizontally extending working die mounted in the face of said die block and extending longitudinally of said frame, a cutoff die mounted in said die block adjacent said working die, a feed means mounted adjacent a first end of said frame on the opposite side of said die block with respect to the face thereof for feeding a length of stock in the horizontal direction through said cutoff die, a gate mounted for reciprocal sliding movement in the horizontal direction in the second end of said frame opposite said first end and carrying a working tool thereon aligned with and for cooperation with said working die, drive means for reciprocating said gate mounted on said first end of said frame, said drive means comprising a shaft rotatably journaled in said frame and extending transversely thereof and having a crank at each end thereof on opposite sides of said frame, a pair of rocker levers journaled at one end each on said frame on the side of said die block opposite the face thereof and havng their free ends extending away from said die block toward said first end of said frame, the free ends of said levers being operatively connected through intermediate linkage to corresponding ones of said cranks for actuation thereby between a first position extending in a direction generally longitudinally of said frame to a second position extending at a substantial angle with respect to said longitudinal direction, a pair of pitmans disposed exteriorly of the frame, one at each side thereof, each of said pitmans being connected at one end to opposite sides of said gate, the other *ends* of said pitmans being connected to the free ends of said levers whereby upon actuation of said levers to said first position said gate is pulled by said pitmans into a working position immediately adjacent said die block and as said levers are moved to said second position said gate is actuated to an inoperative position away from said die block, a knockout pin extending horizontally of said die block and longitudinally of said frame and having a portion thereof extending into said working die, and actuating means for said knockout pin mounted intermediate said frame and means operatively connected to said drive means for operating said actuating means.

References Cited by the Examiner

The following references, cited by the Examiner, are of record in the patented file of this patent or the original patent.

UNITED STATES PATENTS

| | | | |
|---|---|---|---|
| 263,424 | 8/1882 | Nix | 74—40 |
| 2,069,511 | 2/37 | Wilcox | 10—12 |
| 2,475,693 | 7/49 | Borzym | 78—39 |
| 2,542,864 | 2/51 | Friedman | 10—25 |
| 2,696,165 | 12/54 | Hecht | 100—282 |
| 2,830,455 | 4/58 | Harmon | 78—40 |

FOREIGN PATENTS

| | | |
|---|---|---|
| 222,875 | 11/25 | Great Britain. |

WILLIAM J. STEPHENSON, *Primary Examiner.*